Sept. 18, 1923.

E. W. ROBEY

CONVEYER OR THE LIKE

Filed Oct. 13, 1922  4 Sheets-Sheet 1

1,468,545

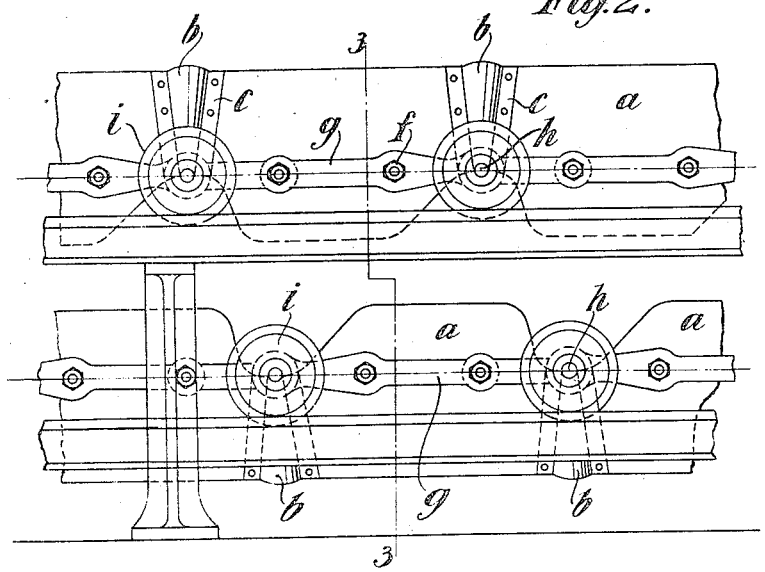
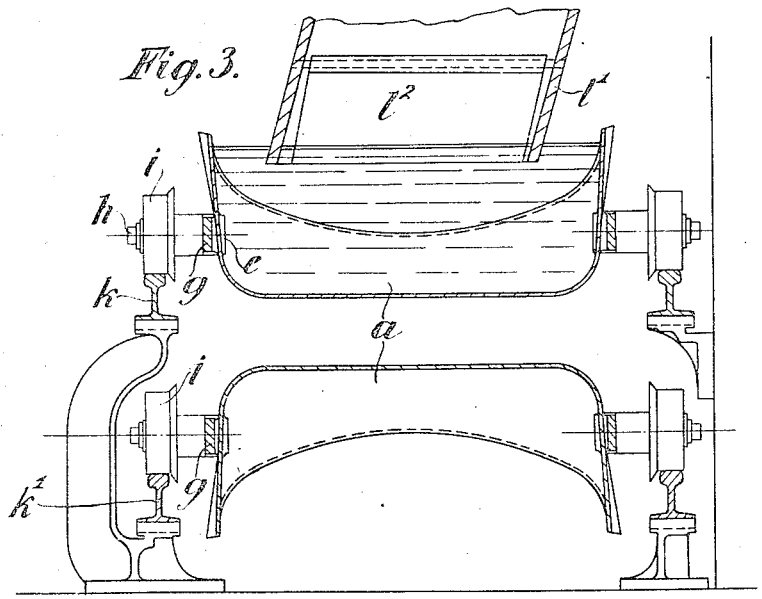

Sept. 18, 1923.  E. W. ROBEY  1,468,545
CONVEYER OR THE LIKE
Filed Oct. 13, 1922    4 Sheets-Sheet 3
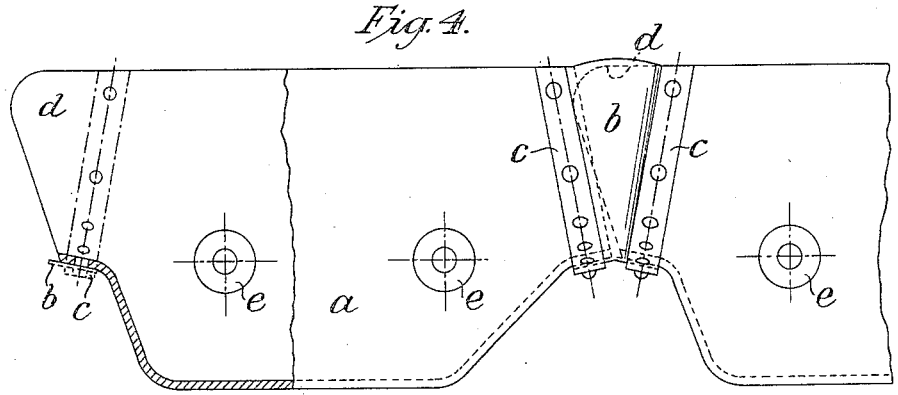
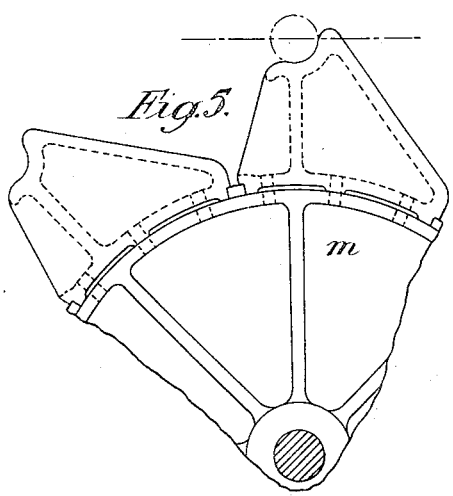
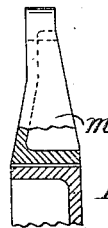
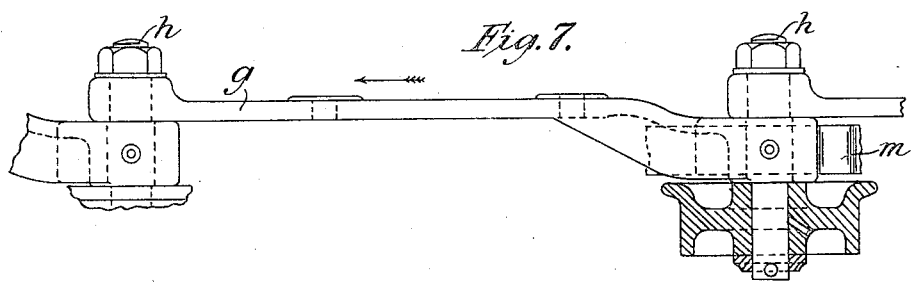
INVENTOR
E. W. Robey,
BY Watson, Coit, Morse + Grindle
ATTYS.

Patented Sept. 18, 1923.

1,468,545

UNITED STATES PATENT OFFICE.

ERNEST WILLIAM ROBEY, OF LONDON, ENGLAND, ASSIGNOR OF A MOIETY TO UNDER-FEED STOKER COMPANY LIMITED, OF LONDON, ENGLAND.

CONVEYER OR THE LIKE.

Application filed October 13, 1922. Serial No. 594,390.

*To all whom it may concern:*

Be it known that I, ERNEST WILLIAM ROBEY, a subject of the King of Great Britain, residing in London, England, have invented certain new and useful Improvements in Conveyers or the like, of which the following is a specification.

This invention relates to a method of causing a material to travel through a liquid. The liquid is confined in a trough which travels and conveys the material while the liquid as a whole remains stationary in the trough.

For this purpose the liquid may be contained in a water-tight or substantially water-tight, flexible trough, which travels after the manner of an endless band, so that the liquid in it remains stationary; the material is carried on the bottom of the trough at the part of the course of the latter where it is moving under the body of the liquid contained in it, and is discharged at a subsequent part of the course. Hence the material travels through the liquid, the trough itself being the conveyer.

The flexibility of the trough, which is requisite to enable it to travel as an endless band, may be attained in any suitable manner. Generally, the trough is made up of a number of short troughs, without ends, connected together by flexible material, the connections being water-tight, or substantially so. For instance, the short troughs may be of pressed steel and may be connected together with flexible gussets of waterproof material.

In some cases the trough may be wholly of flexible material, held as a trough at the part where it is to receive material, but otherwise travelling as a flexible band.

The retention of the water notwithstanding that the trough is endless, may be secured by inclining upwards at each end of the position which the water is to have, the track on which the trough runs.

The invention is particularly applicable for removing ashes and clinker from furnace grates and at the same time sealing the ash-pit or the like by water in the trough. It may also be applied for other purposes, such as the leaching of ores, or other material.

In the accompanying drawings, Fig. 1 is an elevation of a conveyer for removing clinker and ashes from furnaces which have their ash-pits sealed with water.

Fig. 2 is an elevation drawn to a scale larger than that of Fig. 1, of part of the conveyer.

Fig. 3 is a cross section on line 3—3 of Fig. 2 and also through the lower part of a chute from an ash-pit.

Fig. 4 is a sectional elevation, drawn to a still larger scale, of one trough of the conveyer and showing how one section is joined to the next.

Figs. 5, 6 and 7 are detail views drawn to an enlarged scale.

Referring to Figs. 1–7, the conveyer consists of short, dished troughs $a$ which may be pressed from steel plate and are connected together by india rubber gussets $b$, held in place by steel bands $c$ riveted to the troughs; the gussets are protected from injury by pieces of clinker by end extensions $d$ of the troughs (Fig. 4). Bosses $e$ on each side of the trough are drilled to receive water-tight bolts $f$ (Fig. 2) by which the links $g$ of the conveyer chain are fixed to the trough. The links are pivoted to each other by bolts $h$ extensions of which form axles for wheels $i$ (Fig. 7). The latter run on upper and lower tracks $k$, $k'$ beneath the ash-pits $l$ (Fig. 1), the chutes $l'$ of which extend into the conveyer formed by the connected troughs. The upper track $k$ is curved upwards at one end and then assumes a straight path, being carried on an inclined girder $k^2$ to a height convenient for dumping the clinker and ashes. Here the links of the endless chain are engaged by a pair of positively driven sprocket wheels $m$ a suitable construction for which is indicated in Figs. 5 and 6.

During their travel over wheels $m$ the troughs dump their contents into chute $n$ and wheels $i$ engage a short, curved track $o$ by which they are guided into position for engaging the lower track $k'$ when they arrive there. At the other end of the conveyer the chain links engage sprocket wheels $p$ similar to wheels $m$ and are guided back to the upper track by guide rails $q$.

Figure 1:
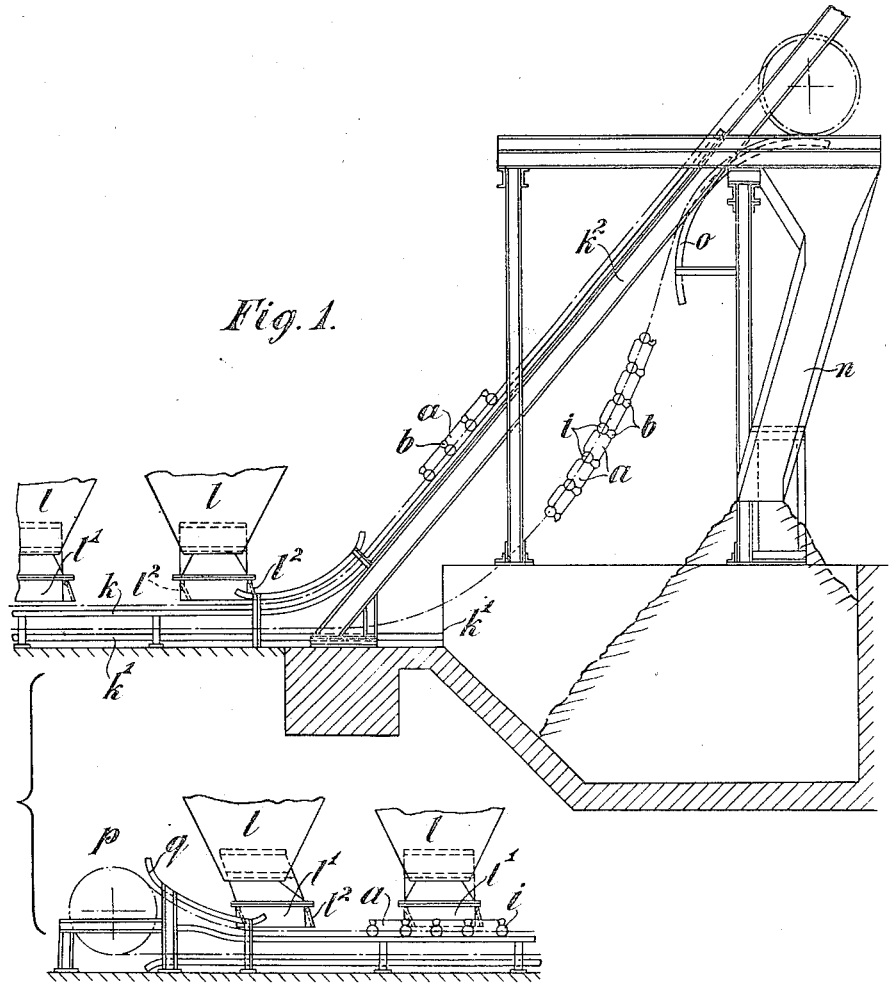

An indicated in Figs. 1 and 3 the mouths of the chutes $l'$ are sealed by water in the conveyer, which water is retained owing to the upward curvature of the path of the conveyer at the ends of that portion of the path which is beneath the ash-pits. The chutes $l'$ are provided with substantially air-tight doors $l^2$ which can be opened by any abnormally large piece of clinker and can subsequently close automatically, in known manner.

The troughs are dished in order that the clinker and ashes may be retained in the part of the conveyer which is travelling up the incline $k^2$. The angle at the rear end of the dishing of the trough is shallower than at the forward end to favour drainage of water from the material conveyed.

Figure 8:
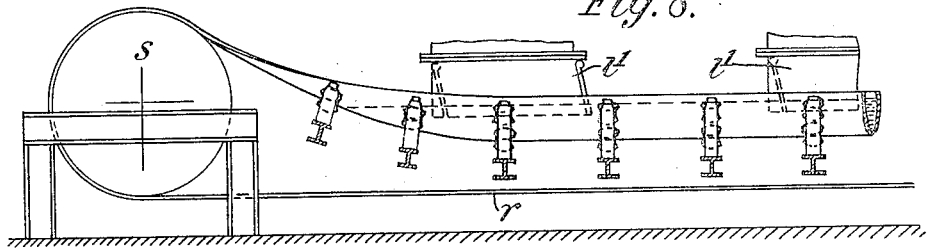
Fig. 8 is a sectional elevation of part of a conveyer consisting of an endless band curved to form a trough where this is required.
Figure 9:
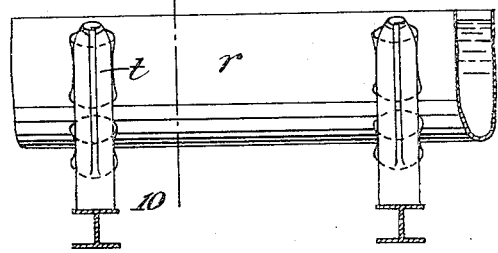
Fig. 9 is a portion of the trough shown in Fig. 8, drawn to an enlarged scale.
Figure 10:
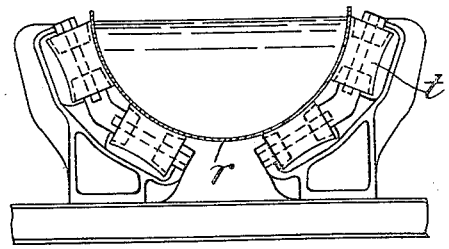
Fig. 10 is a cross section on line 10—10 of Fig. 9.

Referring to Figs. 8–10, $r$ is an endless flexible band which travels round drums $s$. At the portion of its path where it is to form a trough there are provided, at suitable distances apart, sets of rollers $t$ having curved peripheries and placed at such an angle to each other that the profiles of these peripheries in a set lie substantially on the circumference of a circle, as indicated by Fig. 10. The band having been pressed against these rollers is filled with water and thereafter remains as a trough containing the water into which the chutes $l'$ of the ash hoppers extend as previously described. As the band travels on to the drum it becomes flat and the ashes and clinker fall from it after it has left the highest part of the drum, their removal being aided if necessary by a scraper on the descending side of the drum.

An obvious, but not very practicable modification consists in winding the band off one drum on to another so that the movement of the band is reciprocating instead of continuous.

It will be understood that the invention is not limited to the particular construction shown in detail for the sake of illustration, but comprises modifications which come within the scope of the appended claims.

Having thus described the nature of the said invention and the best means I know of carrying the same into practical effect, I claim :—

1. The method of conveying material through a liquid which consists in causing a trough containing the material to travel, confining a body of liquid in the trough and holding the body of liquid stationary in the trough.

2. The method of conveying material through a liquid which consists in disposing the material in an endless flexible trough, confining a body of liquid in a portion of the trough, causing the trough to travel, and holding the body of liquid stationary in the trough.

3. A conveyer comprising in combination, a flexible trough, and means for supporting the trough for travel in a substantially horizontal flight adapted to retain a stationary body of liquid.

4. A conveyer comprising in combination, a flexible trough, and means for supporting the trough so as to form a depressed portion and an elevated portion at each end of the depressed portion, the trough being adapted to travel and to retain a body of liquid stationary in the depressed portion while travelling 5. A conveyer comprising in combination, an endless flexible trough, means for supporting the trough for travel in an upper and a lower horizontal flight, means for supporting the upper flight so as to form a depressed portion and an elevated portion at each end of the depressed portion, the trough being adapted to retain a body of liquid stationary in the depressed portion while travelling.

6. A flexible conveyer comprising in combination, a plurality of open-ended, rigid trough members, and flexible water-tight connections joining the members end to end.

7. A flexible conveyer comprising in combination, a plurality of open-ended, rigid trough members, flexible water-tight connections joining the members end to end, and means for protecting the connections from contact with solid material in the conveyer.

8. A conveyer comprising in combination, a plurality of open-ended rigid trough members, flexible water-tight gussets connecting the members end to end, and a pair of overlapping rigid plates, one secured to each trough member, said plates being adapted to shield the gussets from contact with solid material in the conveyer.

9. A conveyer comprising in combination, a plurality of open-ended, rigid trough members and flexible water-tight connections joining the members end to end, each of said trough members having a depression in its bottom adapted to retain material when the member is in an inclined position.

10. A flexible conveyer comprising in combination, a plurality of rigid, open-ended trough members, flexible liquid-tight connecting means joining the members end to end, and a link member rigidly secured to each side of each trough member, the links secured to adjacent trough members being pivoted together to form a pair of chains.

11. A flexible conveyer comprising in combination, a plurality of rigid open-ended trough members, flexible liquid-tight connecting means joining the trough members end to end, a link member rigidly secured to each side of each trough member, pivot members connecting the links on adjacent trough members, and wheels disposed on said pivot members adapted to support the conveyer on a runway.

In testimony whereof I have signed my name to this specification.

ERNEST WILLIAM ROBEY.